(12) United States Patent
Ichimura et al.

(10) Patent No.: US 11,394,852 B2
(45) Date of Patent: Jul. 19, 2022

(54) INFORMATION PROCESSING APPARATUS, DATA MANAGEMENT APPARATUS, AND NON-TRANSITORY COMPUTER READABLE MEDIUM

(71) Applicant: FUJIFILM BUSINESS INNOVATION CORP., Tokyo (JP)

(72) Inventors: Takeshi Ichimura, Kanagawa (JP); Masahiko Harada, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 205 days.

(21) Appl. No.: 16/564,719

(22) Filed: Sep. 9, 2019

(65) Prior Publication Data
US 2020/0099822 A1    Mar. 26, 2020

(30) Foreign Application Priority Data
Sep. 21, 2018    (JP) .............................. JP2018-178089

(51) Int. Cl.
*H04N 1/44*    (2006.01)
*H04N 1/00*    (2006.01)

(52) U.S. Cl.
CPC ......... *H04N 1/4433* (2013.01); *H04N 1/0048* (2013.01); *H04N 1/00411* (2013.01); *H04N 1/444* (2013.01)

(58) Field of Classification Search
USPC ................ 358/1.1–3.29, 1.11–1.18, 400–403
See application file for complete search history.

(56) References Cited

U.S. PATENT DOCUMENTS

| | | | |
|---|---|---|---|
| 2002/0085228 A1* | 7/2002 | Yagita | ................... G06F 3/1265 358/1.15 |
| 2008/0043282 A1* | 2/2008 | Tsuboi | ............... H04N 1/00464 358/1.15 |
| 2014/0096202 A1* | 4/2014 | Matsuda | ............... H04W 12/06 726/4 |
| 2016/0197925 A1* | 7/2016 | Fukushi | .................. H04L 63/10 726/6 |

FOREIGN PATENT DOCUMENTS

| | | |
|---|---|---|
| JP | 2015-62320 A | 4/2015 |
| JP | 2015-231176 A | 12/2015 |

* cited by examiner

*Primary Examiner* — Marcellus J Augustin
(74) *Attorney, Agent, or Firm* — Oliff PLC

(57) ABSTRACT

An information processing apparatus includes a first reception unit, a first transmission unit, and a processing unit. The first reception unit receives a use request for use of specific data, which are necessary when using the apparatus itself, from a terminal device held by a user of the apparatus itself. The first transmission unit transmits positional information which indicates a position, in a data management apparatus that manages the specific data, at which the specific data which are available to the user are stored, to the terminal device in response to reception of the use request. The processing unit performs a process that uses at least part of the specific data in response to reception of an instruction for the process from the terminal device which references the specific data by connecting to the position which is indicated by the positional information in the data management apparatus.

12 Claims, 9 Drawing Sheets

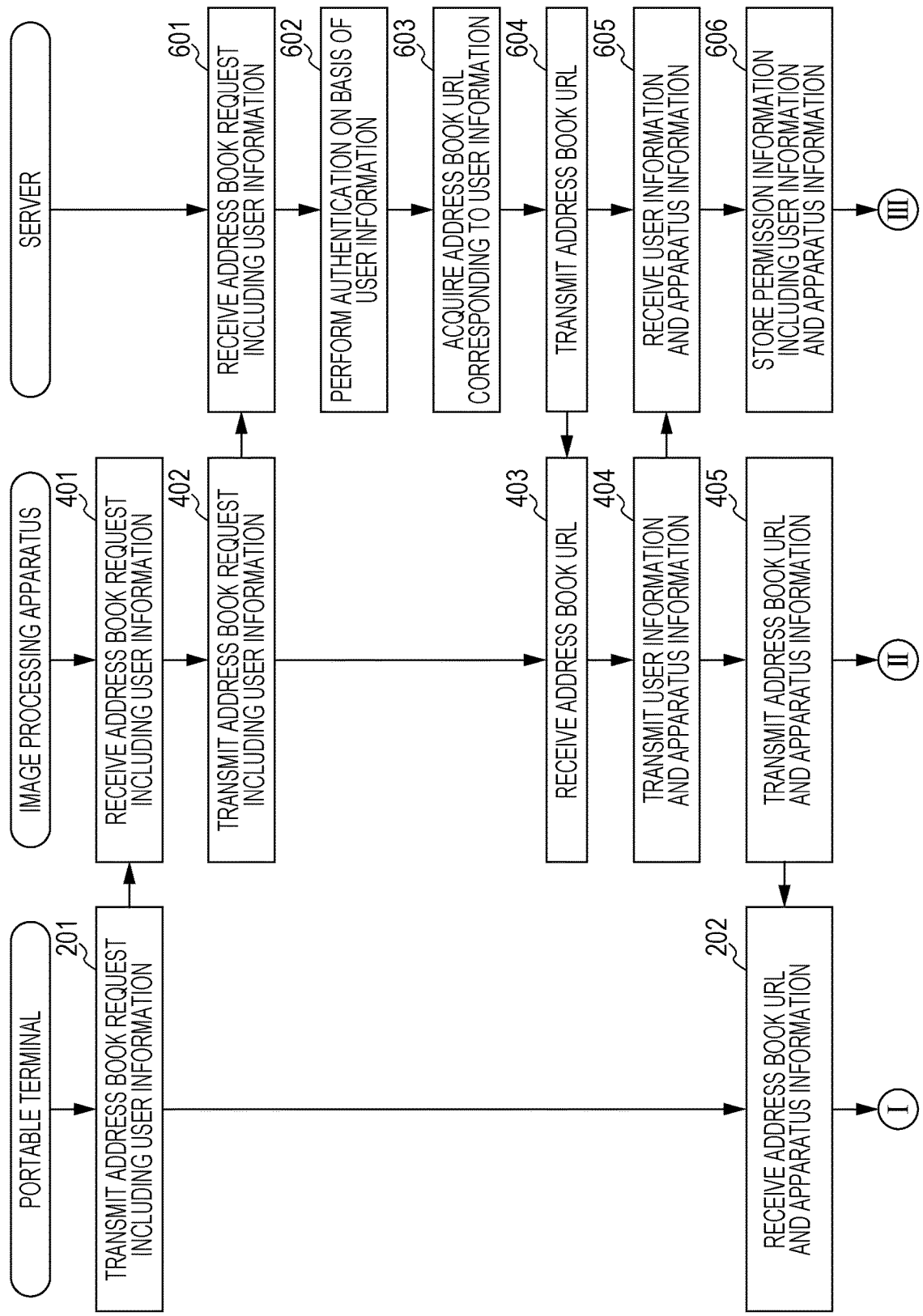

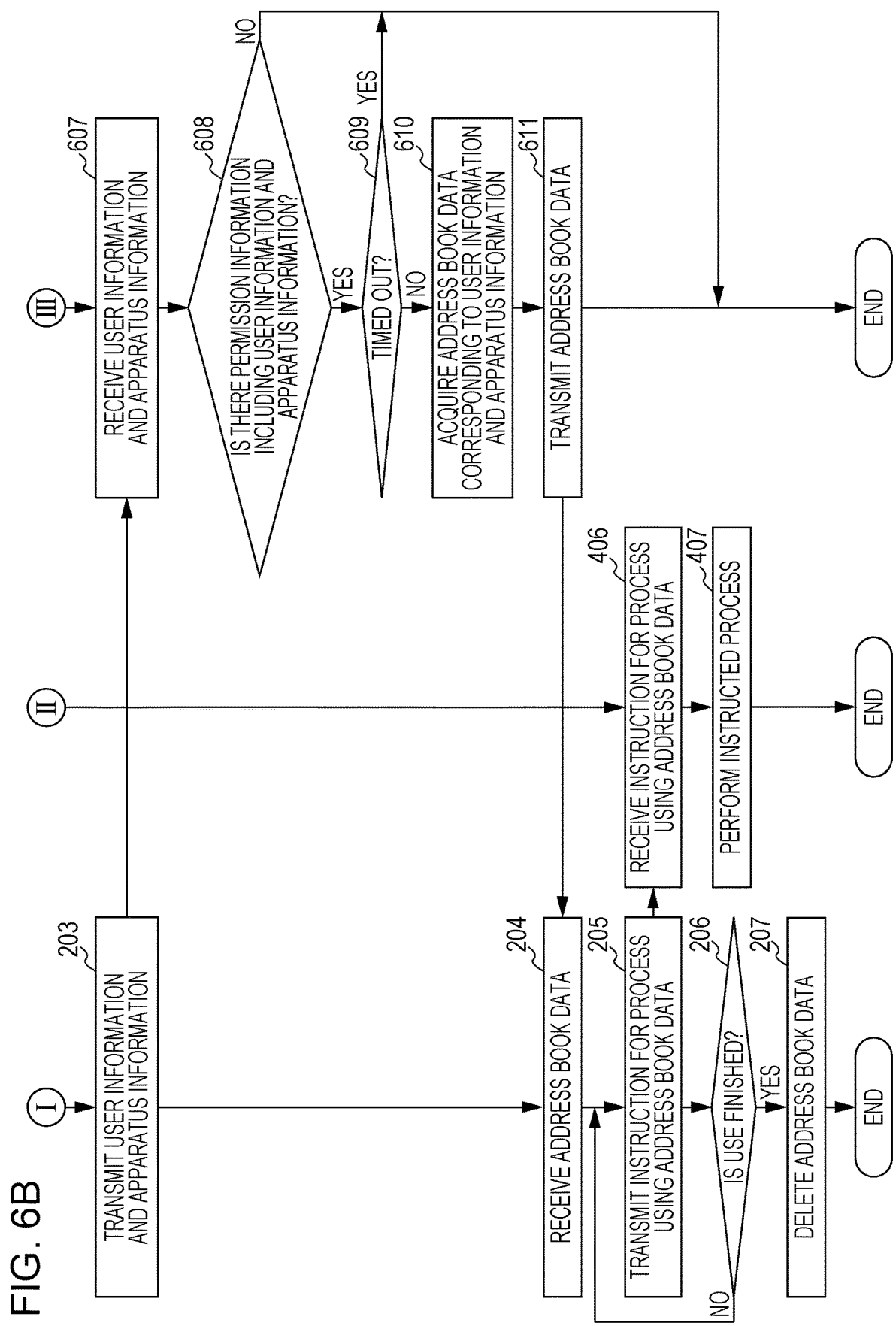

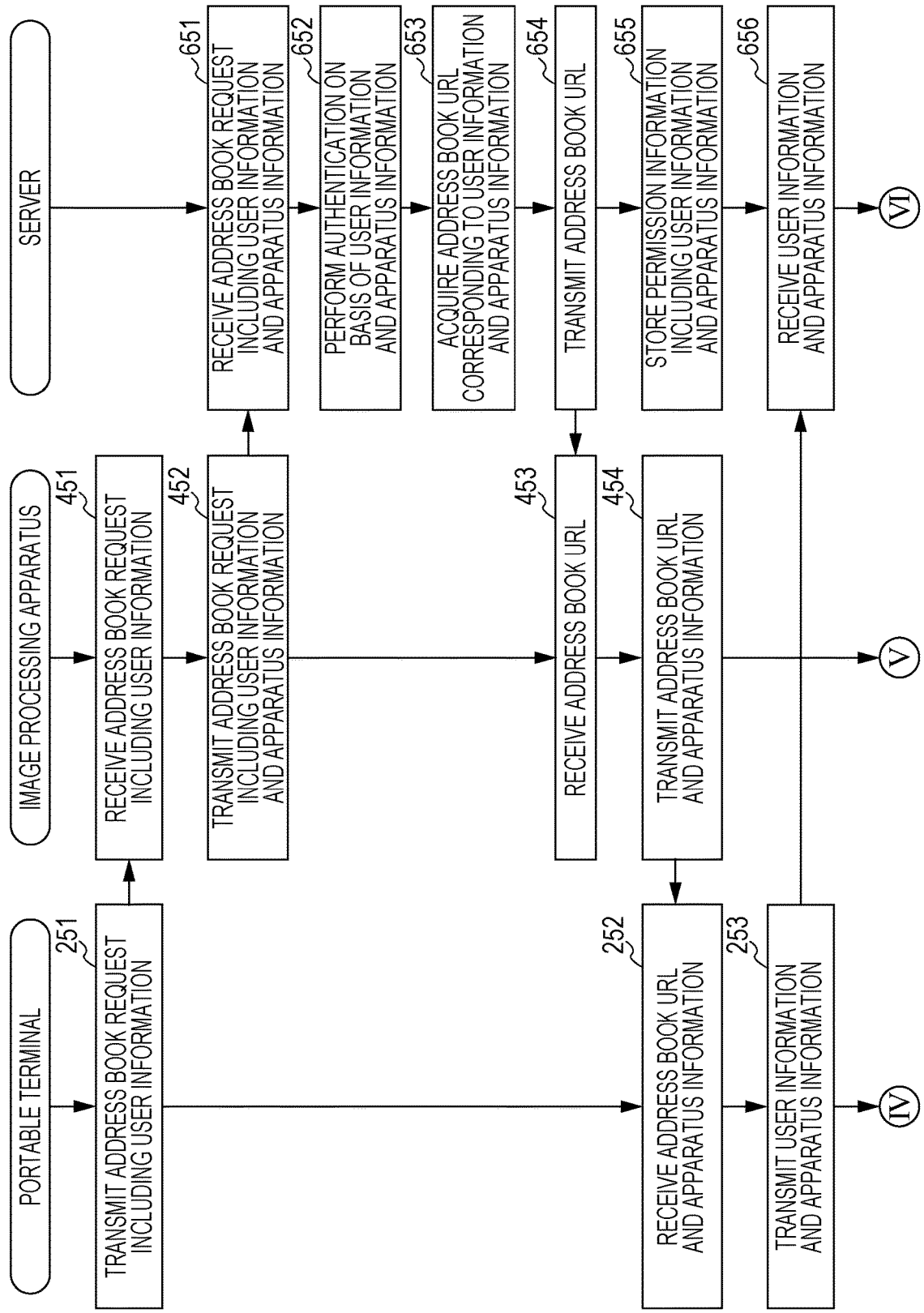

INFORMATION PROCESSING APPARATUS, DATA MANAGEMENT APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-178089 filed Sep. 21, 2018.

BACKGROUND

(i) Technical Field

The present disclosure relates to an information processing apparatus, a data management apparatus, and a non-transitory computer readable medium.

(ii) Related Art

There is known a multi-function device that includes an instruction section that instructs an operation panel to display a user interface (UI) image on the basis of user information that includes at least user identification information input from a portable terminal device or through the operation panel, and that instructs the portable terminal device to display the UI image on a display panel provided to the portable terminal device, in which such UI images are basically the same as each other, and enable setting of an address for Internet facsimile, display of an address book, setting for Internet facsimile reception, and setting for Internet facsimile transmission (see Japanese Unexamined Patent Application Publication No. 2015-62320, for example).

SUMMARY

In the case where specific data, which are necessary when using an information processing apparatus, are displayed on an operation panel of the information processing apparatus, there may be inconvenience in using such specific data, since the display region of the operation panel is small, for example. If the specific data, which are necessary when using the information processing apparatus, are held in a terminal device carried by a user that uses the information processing apparatus, meanwhile, there is a risk of leakage of the specific data.

Aspects of non-limiting embodiments of the present disclosure relate to reducing the risk of leakage of specific data, which are necessary when using an information processing apparatus, to the outside since the specific data are held in a terminal device carried by a user without using an operation panel of the information processing apparatus.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including: a first reception unit that receives a use request for use of specific data, which are necessary when using the apparatus itself, from a terminal device held by a user of the apparatus itself; a first transmission unit that transmits positional information which indicates a position, in a data management apparatus that manages the specific data, at which the specific data which are available to the user are stored, to the terminal device in response to reception of the use request; and a processing unit that performs a process that uses at least part of the specific data in response to reception of an instruction for the process from the terminal device which references the specific data by connecting to the position which is indicated by the positional information in the data management apparatus.

BRIEF DESCRIPTION OF THE DRAWINGS

An exemplary embodiment of the present disclosure will be described in detail based on the following figures, wherein:

FIGS. 6A and 6B are sequence diagrams illustrating a first operation example of the information processing system according to the exemplary embodiment of the present disclosure; and FIGS. 7A and 7B are sequence diagrams illustrating a third operation example of the information processing system according to the exemplary embodiment of the present disclosure.

DETAILED DESCRIPTION

An exemplary embodiment of the present disclosure will be described in detail below with reference to the accompanying drawings.

[Overall Configuration of Information Processing System]

Figure 1:
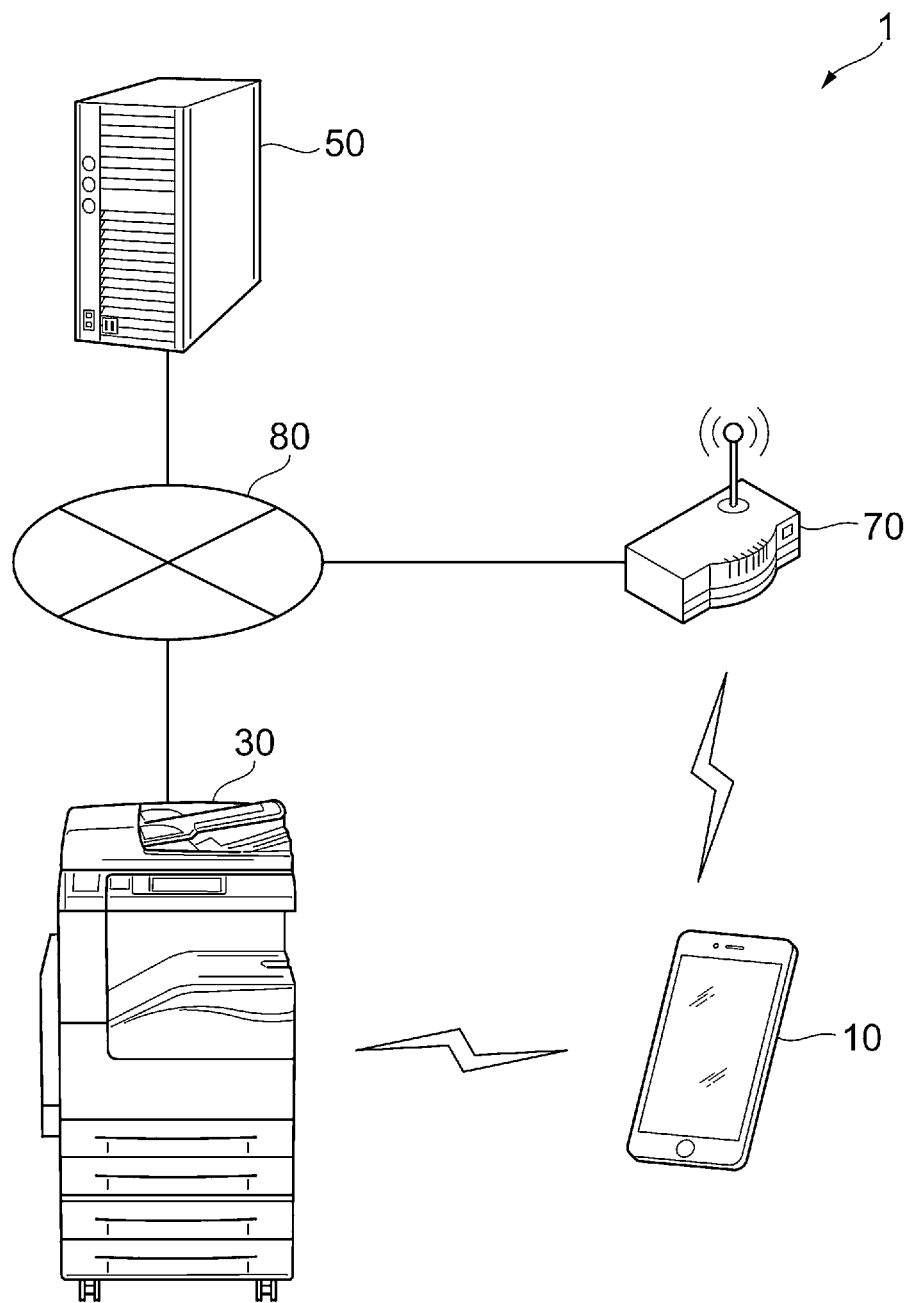
FIG. 1 illustrates an example of the overall configuration of an information processing system according to an exemplary embodiment of the present disclosure.

FIG. 1 illustrates an example of the overall configuration of an information processing system 1 according to the present exemplary embodiment. As illustrated in the drawing, the information processing apparatus 1 includes a portable terminal 10, an image processing apparatus 30, and a server 50. The portable terminal 10 is wirelessly connectable to a communication line 80 via an access point 70 through wireless communication such as Wi-Fi (registered trademark), and is also wirelessly connectable to the image processing apparatus 30 through near-field wireless communication such as NFC (Near Field Communication). The image processing apparatus 30 and the server 50 are connected to the communication line 80. While there is only one each of portable terminal 10, image processing apparatus 30, and server 50 in the drawing, there may be a plurality of portable terminals 10, image processing apparatuses 30, and servers 50. The communication line 80 may be the Internet, for example.

The portable terminal 10 is a computer device that is used by a user of the image processing apparatus 30. When the server 50 which manages specific data, which are necessary when using the image processing apparatus 30, is accessed, the specific data may not be displayed on an operation panel of the image processing apparatus 30, since the display region of the operation panel of the image processing apparatus 30 is small, for example. Thus, the portable terminal 10 displays the specific data, which are necessary when using the image processing apparatus 30, in place of the image processing apparatus 30. The portable terminal 10 is preferably implemented by a smartphone, for example. In the present exemplary embodiment, the portable terminal 10 is provided as an example of a terminal device.

The image processing apparatus 30 is a device that performs image processing such as forming an image on a recording medium such as paper, reading an image from a recording medium such as paper, transmitting an image to a public line, and receiving an image from a public line. It should be noted, however, that the image processing apparatus 30 may perform at least one of such image processing operations. For example, the image processing apparatus 30 is a printer from the viewpoint of forming an image only, a scanner from the viewpoint of reading an image only, a copier from the viewpoint of reading an image and forming an image, and a facsimile from the viewpoint of reading an image, transmitting an image, receiving an image, and forming an image. In the present exemplary embodiment, the image processing apparatus 30 is provided as an example of an information processing apparatus.

The server 50 is a computer device that manages the specific data which are necessary when using the image processing apparatus 30. The server 50 also authenticates the user who uses the portable terminal 10. The server 50 may be divided into a portion that manages the specific data as a data management server and a portion that authenticates the user as an authentication server. In the following description, however, the portion that manages the specific data and the portion that authenticates the user are integrated in the server 50. In the present exemplary embodiment, the server 50 is provided as an example of a data management device.

[Hardware Configuration of Portable Terminal]

Figure 2:
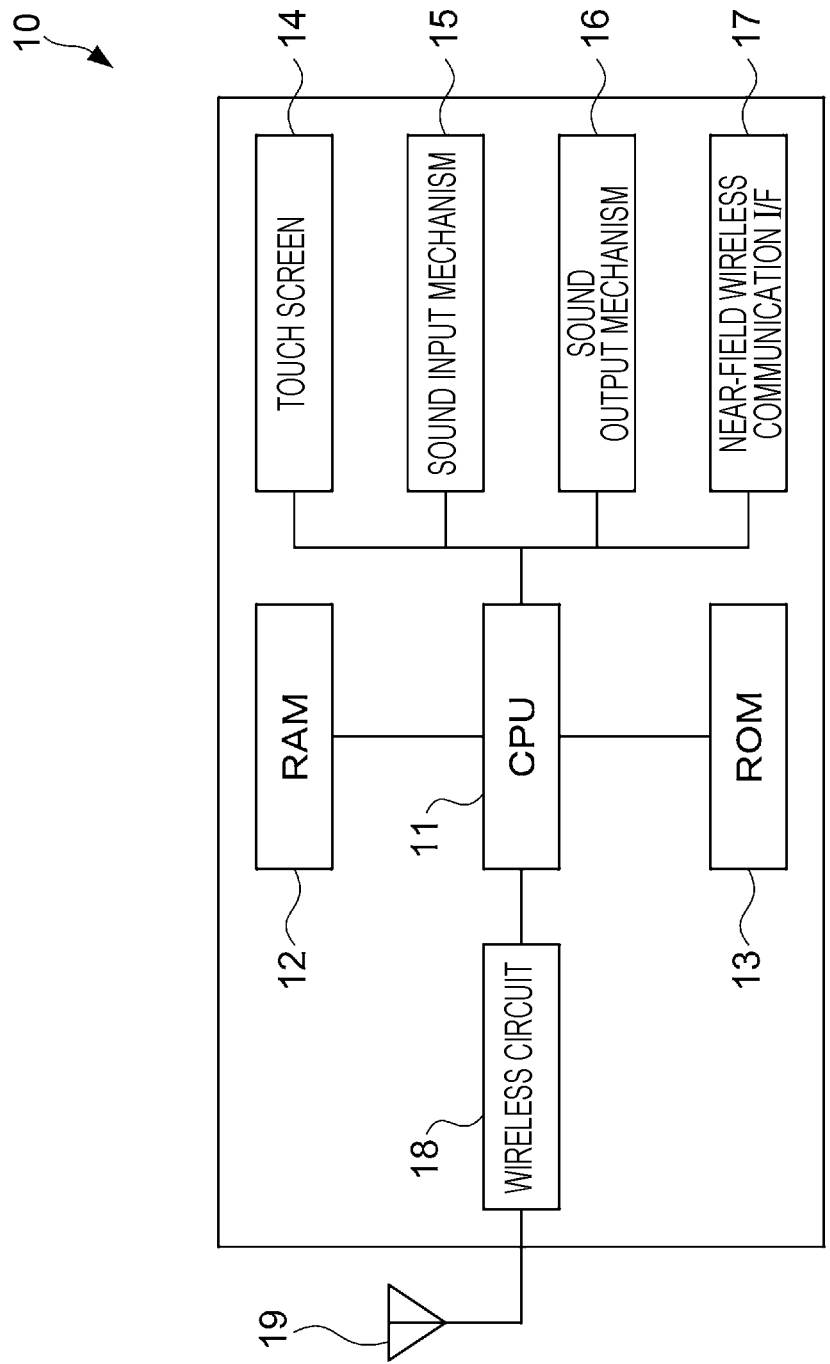
FIG. 2 illustrates an example of the hardware configuration of a portable terminal according to the exemplary embodiment of the present disclosure.

FIG. 2 illustrates an example of the hardware configuration of the portable terminal 10 according to the present exemplary embodiment. As illustrated in the drawing, the portable terminal 10 includes a central processing unit (CPU) 11 that serves as a computation unit, a random access memory (RAM) 12 and a read only memory (ROM) 13 that each serve as a storage unit, a touch screen 14 that displays various information and receives an operation input from the user, a sound input mechanism 15 such as a microphone, a sound output mechanism 16 such as a speaker, and a near-field wireless communication interface (I/F) 17 that transmits and receives various information to and from the image processing apparatus 30 through near-field wireless communication such as NFC. The portable terminal 10 also includes a wireless circuit 18 and an antenna 19 that perform wireless communication via a base station. The wireless circuit 18 includes a baseband large-scale integrated (LSI) chip that performs signal processing on digital data transmitted and received wirelessly, although not illustrated.

[Hardware Configuration of Image Processing Apparatus]

Figure 3:
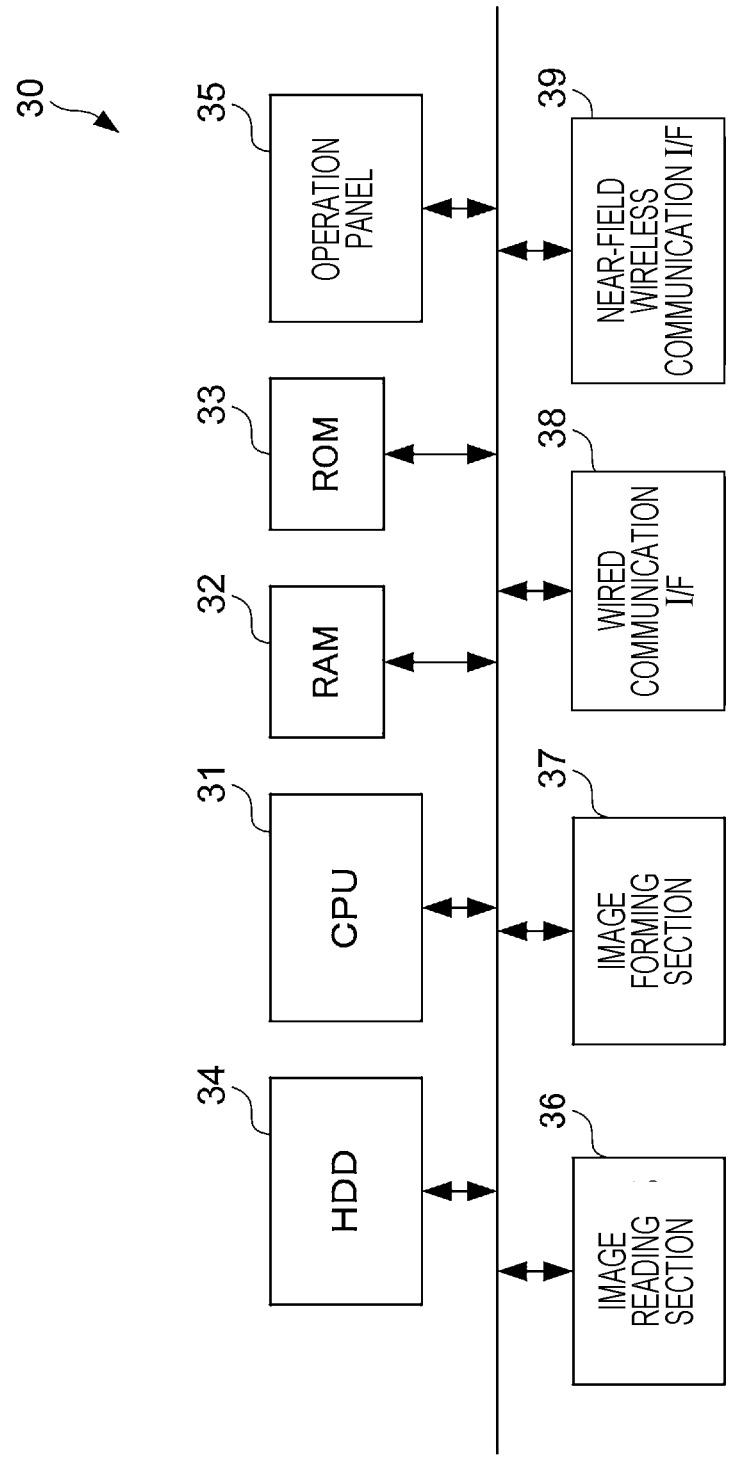
FIG. 3 illustrates an example of the hardware configuration of an image processing apparatus according to the exemplary embodiment of the present disclosure.

FIG. 3 illustrates an example of the hardware configuration of the image processing apparatus 30 according to the present exemplary embodiment. As illustrated in the drawing, the image processing apparatus 30 includes a CPU 31, a RAM 32, a ROM 33, a hard disk drive (HDD) 34, an operation panel 35, an image reading section 36, an image forming section 37, a wired communication interface (hereinafter referred to as a "wired communication I/F") 38, and a near-field wireless communication interface (hereinafter referred to as a "near-field wireless communication I/F") 39.

The CPU 31 loads various types of programs stored in the ROM 33 etc. into the RAM 32 to execute the programs to implement various functions to be discussed later.

The RAM 32 is a memory that is used as a working memory for the CPU 31, for example. The ROM 33 is a memory that stores the various types of programs etc. to be executed by the CPU 31. The HDD 34 is a magnetic disk device, for example, that stores image data read by the image reading section 36, image data for use in image formation performed by the image forming section 37, etc.

The operation panel 35 is a touch screen, for example, that displays various information and that receives an operation input from the user. The operation panel 35 is composed of a display that displays the various information and a position detection sheet that detects a position indicated by an indication unit such as a finger or a stylus pen. Alternatively, a display and a keyboard may be used in place of the touch screen.

The image reading section 36 reads an image recorded on a recording medium such as paper. The image reading section 36 may be a scanner, for example, and may be of a CCD type in which light radiated from a light source and reflected by an original copy is contracted using a lens to be received by charge coupled devices (CCD), or a CIS type in which light sequentially radiated from a light emitting diode (LED) light source and reflected by an original copy is received by a contact image sensor (CIS).

The image forming section 37 forms an image on a recording medium such as paper. The image forming section 37 may be a printer, for example, and may be of an electrophotographic system in which toner adhering to a photosensitive body is transferred onto a recording medium to form an image, or an inkjet type in which ink is injected onto a recording medium to form an image.

The wired communication I/F 38 transmits and receives various information to and from other devices, such as the portable terminal 10 and the server 50, via the communication line 80. The near-field wireless communication I/F 39 transmits and receives various information to and from the portable terminal 10 through near-field wireless communication such as NFC.

[Hardware Configuration of Server]

Figure 4:
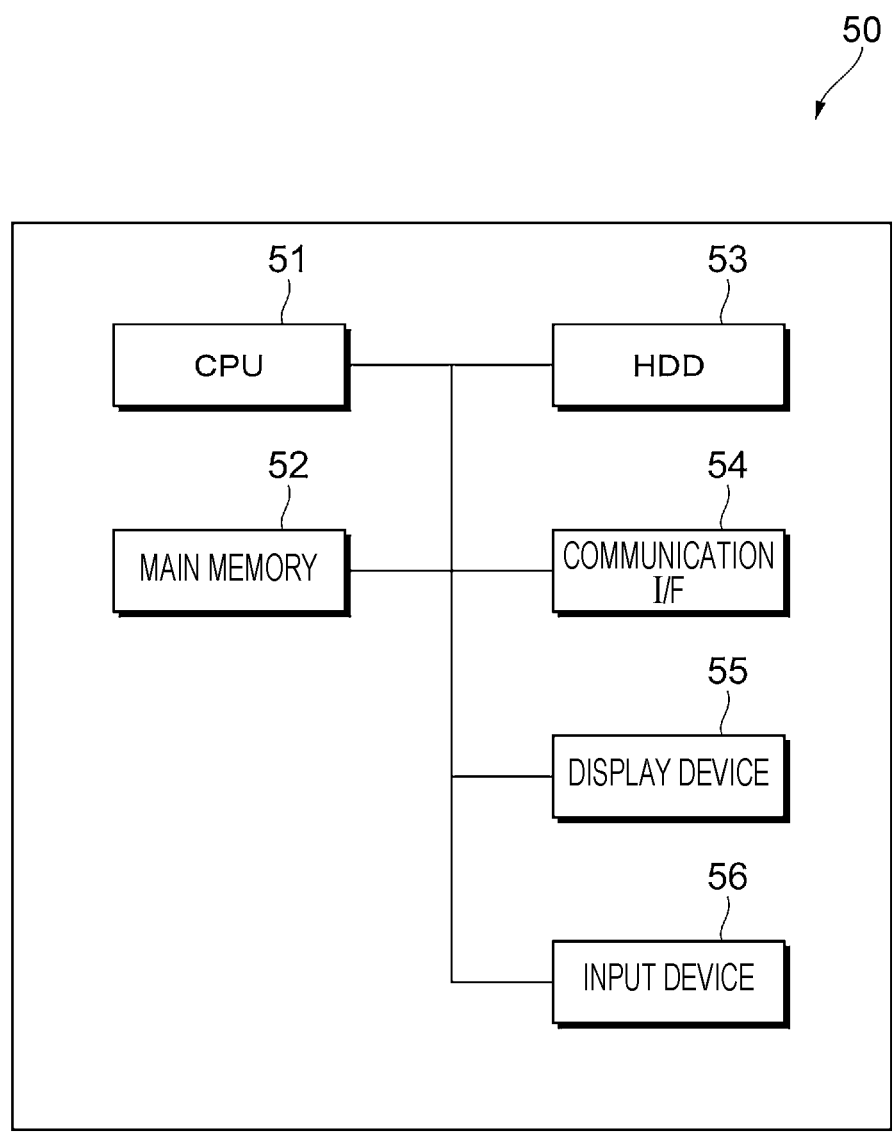
FIG. 4 illustrates an example of the hardware configuration of a server according to the exemplary embodiment of the present disclosure.

FIG. 4 illustrates an example of the hardware configuration of the server 50 according to the present exemplary embodiment. As illustrated in the drawing, the server 50 includes a CPU 51 that serves as a computation unit, and a main memory 52 and an HDD 53 that each serve as a storage unit. The CPU 51 executes various types of software such as an operating system (OS) and applications, and implements functions to be discussed later. The main memory 52 is a storage region in which the various types of software, data for execution of such software, etc., are stored. The HDD 53 is a storage region in which data input to the various types of software, data output from the various types of software, etc., are stored. The server 50 further includes a communication interface (I/F) 54 for external communication, a display device 55 such as a display, and an input device 56 such as a keyboard and a mouse.

[Overview of Present Exemplary Embodiment]

In the present exemplary embodiment, in the information processing system 1, when the portable terminal 10 transmits a use request for specific data, which are necessary when using the image processing apparatus 30, to the image processing apparatus 30, the server 50 receives the use request from the image processing apparatus 30, and transmits positional information that indicates the position at which the specific data which are available to the user of the portable terminal 10 are stored to the portable terminal 10 via the image processing apparatus 30. Then, when the portable terminal 10 transmits an instruction for a process that uses at least part of the specific data which are referenced by connecting to the position which is indicated by the positional information in the server 50 to the image processing apparatus 30, the image processing apparatus 30 performs the process. In the following detailed description, address book data are taken as an example of the specific data which are necessary when using the image processing apparatus 30.

[Functional Configuration of Information Processing System]

Figure 5:
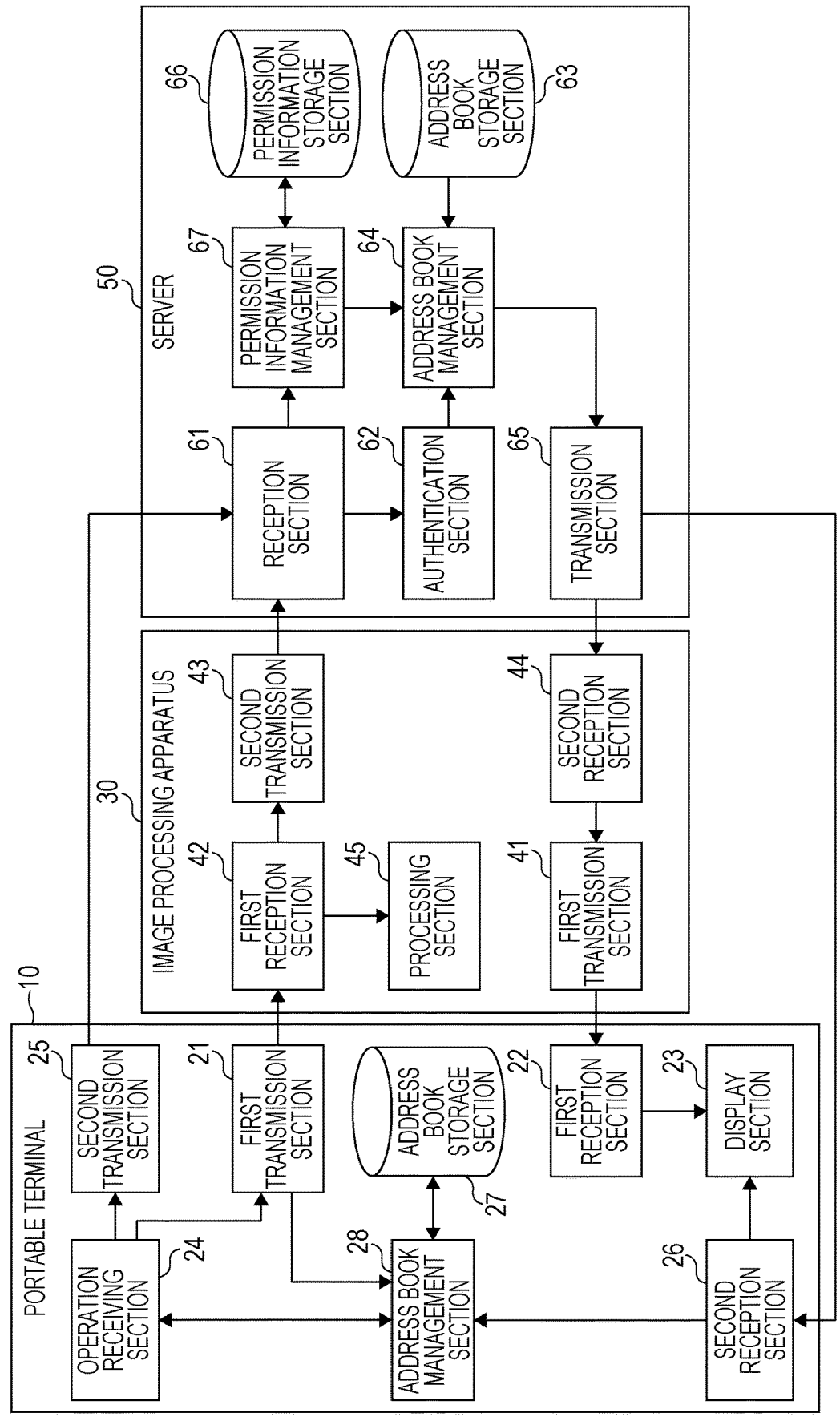
FIG. 5 is a block diagram illustrating an example of the functional configuration of devices that constitute the information processing system according to the exemplary embodiment of the present disclosure.

FIG. 5 is a block diagram illustrating an example of the functional configuration of devices that constitute the information processing system 1 according to the present exemplary embodiment.

First, an example of the functional configuration of the portable terminal 10 according to the present exemplary embodiment will be described. The portable terminal 10 according to the present exemplary embodiment includes a first transmission section 21, a first reception section 22, a display section 23, an operation receiving section 24, a second transmission section 25, a second reception section 26, an address book storage section 27, and an address book management section 28.

The first transmission section 21 transmits a use request (hereinafter referred to as an "address book request") for use of address book data to the image processing apparatus 30 through NFC when the portable terminal 10 is caused to touch an NFC reader/writer of the image processing apparatus 30. The address book request includes user information that indicates the user of the portable terminal 10. The user information may be a user ID that identifies the user, and may be set in advance to the portable terminal 10. In the present exemplary embodiment, the function of the first transmission section 21 is used as an example of a first transmission function of transmitting a use request for use of the specific data to the information processing apparatus.

In addition, when the operation receiving section 24 receives an operation to instruct a process performed by the image processing apparatus 30 using a piece of address book data selected from the address book data which are displayed on the touch screen 14 as discussed later, the first transmission section 21 transmits an instruction for such a process to the image processing apparatus 30 through NFC. The selected piece of address book data may be all or part of the address book data which are displayed on the touch screen 14. In the present exemplary embodiment, the function of the first transmission section 21 is also used as an example of a first transmission function of transmitting an instruction for a process that uses at least part of the specific data to the information processing apparatus.

The first reception section 22 receives a uniform resource locator (URL) (hereinafter referred to as an "address book URL") of the address book data which are available to the user in the server 50 in the case where the address book URL is sent from the image processing apparatus 30 through NFC when the first transmission section 21 transmits the address book request to the image processing apparatus 30. In that event, in a first operation example and a third operation example, the first reception section 22 also receives apparatus information which indicates the image processing apparatus 30 and which is sent from the image processing apparatus 30 together with the address book URL. The apparatus information may be an apparatus ID that identifies the image processing apparatus 30, and may be set in advance to the image processing apparatus 30. In a second operation example, meanwhile, the first reception section 22 does not receive the apparatus information. In the present exemplary embodiment, the address book URL is used as an example of positional information that indicates the position, in the data management apparatus, at which the specific data which are available to the user of the information processing apparatus are stored, and the function of the first reception section 22 is used as an example of a first reception function of receiving the positional information from the information processing apparatus.

The display section 23 displays the address book URL which is received by the first reception section 22 on the touch screen 14. The display section 23 also displays address book data, which are received by the second reception section 26 as discussed later, on the touch screen 14.

The operation receiving section 24 receives an operation for connection to the address book URL which is displayed on the touch screen 14. The operation receiving section 24 also receives an operation to select a piece of address book data to be used in the process from the address book data which are displayed on the touch screen 14, and to instruct the image processing apparatus 30 to perform a process using the selected piece of address book data.

The second transmission section 25 transmits a request for connection to the address book URL, which is displayed on the touch screen 14, to the server 50 when the operation receiving section 24 receives an operation for connection to the address book URL. In that event, in the first operation example and the third operation example, the second transmission section 25 transmits the user information and the apparatus information to the server 50. The user information which is included in the address book request which is transmitted from the first transmission section 21 may be used. The apparatus information which is received by the first reception section 22 together with the address book URL may be used. In the second operation example, meanwhile, the second transmission section 25 transmits the user information to the server 50.

The second reception section 26 receives the address book data in the case where the address book data are sent from the server 50 when the second transmission section 25 transmits a request for connection to the address book URL to the server 50. In the present exemplary embodiment, the function of the second reception section 26 is used as an example of a second reception function of receiving the specific data from the data management apparatus.

The address book storage section 27 stores the address book data which are received from the server 50 by the second reception section 26.

The address book management section 28 manages the address book data which are stored in the address book storage section 27. Specifically, when the second reception section 26 receives the address book data from the server 50, the address book management section 28 writes the address book data into the address book storage section 27. When the operation receiving section 24 receives an operation to select a piece of address book data to be used in the process performed by the image processing apparatus 30 from the address book data which are displayed on the touch screen 14, in addition, the address book management section 28 reads the selected piece of address book data from the address book data which are stored in the address book storage section 27. When use of the address book data is ended, further, the address book management section 28 deletes the address book data which are stored in the address book storage section 27. The end of use of the address book data may be determined on the basis of the first transmission section 21 transmitting the selected piece of address book data to the image processing apparatus 30, or may be determined on the basis of the user inputting information indicating that use of the address book data has been ended and the operation receiving section 24 receiving such information. In the present exemplary embodiment, the function of the address book management section 28 is used as an example of a deletion function of deleting the specific data.

Next, an example of the functional configuration of the image processing apparatus 30 according to the present exemplary embodiment will be described. The image processing apparatus 30 according to the present exemplary embodiment includes a first transmission section 41, a first reception section 42, a second transmission section 43, a second reception section 44, and a processing section 45.

The first transmission section 41 transmits an address book URL to the portable terminal 10 when the second reception section 44 receives the address book URL from the server 50 as discussed later. In that event, in the first operation example and the third operation example, the first transmission section 41 also transmits the apparatus information to the portable terminal 10. In a second operation example, meanwhile, the first transmission section 41 does not transmit the apparatus information. In the present exemplary embodiment, the first transmission section 41 is provided as an example of a first transmission unit that transmits positional information to the terminal device.

The first reception section 42 receives an address book request from the portable terminal 10 through NFC when the portable terminal 10 is caused to touch the NFC reader/writer of the image processing apparatus 30. The address book request includes user information that indicates the user of the portable terminal 10. In the present exemplary embodiment, the first reception section 42 is provided as an example of a first reception unit that receives a use request for use of the specific data from the terminal device.

The first reception section 42 also receives an instruction for a process that uses a piece of address book data selected from the address book data which are displayed on the touch screen 14 of the portable terminal 10 from the portable terminal 10.

The second transmission section 43 transmits an address book request to the server 50 when the first reception section 42 receives the address book request. In that event, in the first operation example and the second operation example, the second transmission section 43 includes the user information, which is included in the address book request which is received by the first reception section 42, in the address book request as it is. In this case, the second transmission section 43 transmits the user information and the apparatus information to the server 50 after the second reception section 44 receives the address book URL from the server 50 as discussed later in the first operation example, and transmits the user information to the server 50 after the second reception section 44 receives the address book URL from the server 50 as discussed later in the second example. In the first operation example according to the present exemplary embodiment, the second transmission section 43 is provided as an example of a second transmission unit that transmits the user information and the apparatus information to the data management apparatus. In the second operation example according to the present exemplary embodiment, the second transmission section 43 is provided as an example of a second transmission unit that transmits the user information to the data management apparatus. In the third operation example, meanwhile, the second transmission section 43 includes the apparatus information in the address book request in addition to the user information which is included in the address book request which is received by the first reception section 42. In this case, the second transmission section 43 has already transmitted the user information and the apparatus information to the server 50, and thus does not transmit the user information and the apparatus information to the server 50 after the second reception section 44 receives the address book URL from the server 50 as discussed later. In the third operation example according to the present exemplary embodiment, the second transmission section 43 is provided as an example of a second transmission unit that transmits the user information and the apparatus information to the data management apparatus.

The second reception section 44 receives an address book URL in the case where the address book URL is sent from the server 50 when the second transmission section 43 transmits the address book request to the server 50. In the present exemplary embodiment, the second reception section 44 is provided as an example of a second reception unit that receives positional information from the data management apparatus.

The processing section 45 performs a process according to an instruction for a process that uses a piece of address book data selected from the address book data which are displayed on the touch screen 14 of the portable terminal 10 when the first reception section 42 receives the instruction from the portable terminal 10. This process includes a process of transmitting a scan image obtained by scanning a document to a mail address included in the selected piece of address book data by electronic mail, or to a facsimile number included in the selected piece of address book data by facsimile, for example. In the present exemplary embodiment, the processing section 45 is provided as an example of a processing unit that performs a process in response to reception of an instruction for a process that uses at least part of the specific data.

Next, an example of the functional configuration of the server 50 according to the present exemplary embodiment will be described. The server 50 according to the present exemplary embodiment includes a reception section 61, an authentication section 62, an address book storage section 63, an address book management section 64, a transmission section 65, a permission information storage section 66, and a permission information management section 67.

The reception unit 61 receives an address book request from the image processing apparatus 30. In that event, in the first operation example and the second operation example, the address book request includes the user information. In this case, the user information and the apparatus information are sent from the image processing apparatus 30 after the transmission section 65 transmits an address book URL to the image processing apparatus 30 as discussed later, and thus the reception section 61 receives the user information and the apparatus information. In the third operation example, meanwhile, the address book request includes the user information and the apparatus information. In this case, the reception section 61 does not receive the user information and the apparatus information after the transmission section 65 transmits an address book URL to the image processing apparatus 30 as discussed later. In the present exemplary embodiment, the reception section 61 is provided as an example of a reception unit that receives a use request for use of the specific data from the information processing apparatus.

The authentication section 62 performs an authentication when the reception section 61 receives the address book request. In that event, in the first operation example and the second operation example, the authentication section 62 performs an authentication on the basis of the user information since the address book data include the user information. In the third operation example, meanwhile, the authentication section 62 performs an authentication on the basis of the user information and the apparatus information since the address book data include the user information and the apparatus information.

The address book storage section 63 stores the address book data. In that event, in the first operation example and the third operation example, the address book data are stored for each user and for each image processing apparatus 30. That is, the address book data may be stored in association with the user information and the apparatus information so that an address book URL that indicates an address at which the address book data are stored may be acquired. In the second operation example, meanwhile, the address book data are stored for each user. That is, the address book data may be stored in association with the user information so that an address book URL that indicates an address at which the address book data are stored may be acquired. In the present exemplary embodiment, the address book storage section 63 is provided as an example of a storage unit that stores the specific data.

The address book management section 64 manages the address book data which are stored in the address book storage section 63.

Specifically, when the reception section 61 receives an address book request from the image processing apparatus 30 and the authentication section 62 successfully performs an authentication, the address book management section 64 acquires an address book URL that indicates an address in the address book storage section 63 at which the address book data are stored. In that event, in the first operation example and the second operation example, the address book management section 64 receives the user information from the authentication section 62, and acquires the address book URL of the address book data which are available to the user who is indicated by the user information. In the third operation example, the address book management section 64 receives the user information and the apparatus information from the authentication section 62, and acquires the address book URL of the address book data which are available to the user who is indicated by the user information on the image processing apparatus 30 which is indicated by the apparatus information.

When the reception section 61 receives a request for connection to the address book URL from the portable terminal 10 and information indicating that information received together with the request is stored in the permission information storage section 66 is sent from the permission information management section 67, the address book management section 64 reads the address book data which are stored in the address book storage section 63. In that event, in the first operation example and the third operation example, the reception section 61 receives the user information and the apparatus information together with the request for connection to the address book URL, and thus the address book management section 64 reads a piece of address book data corresponding to the user information and the apparatus information, among the address book data which are stored in the address book storage section 63. In the second operation example, meanwhile, the reception section 61 receives the user information together with the request for connection to the address book URL, and thus the address book management section 64 reads a piece of address book data corresponding to the user information, among the address book data which are stored in the address book storage section 63.

The transmission section 65 transmits the address book URL which is acquired by the address book management section 64 to the image processing apparatus 30 when the reception section 61 receives the address book request from the image processing apparatus 30. In the present exemplary embodiment, the transmission section 65 is provided as an example of a transmission unit that transmits positional information to the information processing apparatus.

In addition, the transmission section 65 transmits the address book data which are read by the address book management section 64 to the portable terminal 10 when the reception section 61 receives a request for connection to the address book URL from the portable terminal 10.

The permission information storage section 66 stores permission information for permitting transmission of the address book data to the portable terminal 10 in the case where the reception section 61 receives a request for connection to the address book URL from the portable terminal 10 within a time determined in advance. In that event, in the first operation example and the third operation example, the reception section 61 receives the user information and the apparatus information from the image processing apparatus 30, and thus the permission information storage section 66 stores tied information, which is obtained by tying the user information and the apparatus information to each other, as the permission information. In the second operation example, meanwhile, the reception section 61 receives the user information from the image processing apparatus 30, and thus the permission information storage section 66 stores the user information as the permission information.

The permission information management section 67 manages the permission information which is stored in the permission information storage section 66.

Specifically, when the reception section 61 receives the address book request from the image processing apparatus 30, the authentication section 62 successfully performs an authentication, and the transmission section 65 transmits the address book URL, the permission information management section 67 stores the permission information in the permission information storage section 66. In that event, in the first operation example and the third operation example, the reception section 61 receives the user information and the apparatus information from the image processing apparatus 30, and thus the permission information management section 67 stores tied information, which is obtained by tying the user information and the apparatus information to each other, as the permission information in the permission information storage section 66. In the second operation example, meanwhile, the reception section 61 receives the user information from the image processing apparatus 30, and thus the permission information management section 67 stores the user information as the permission information in the permission information storage section 66.

When the reception section 61 receives a request for connection to the address book URL from the portable terminal 10, and if information received together with the request is stored in the permission information storage section 66, the permission information management section 67 transmits information indicating that such information is stored to the address book management section 64. In that event, in the first operation example and the third operation example, the reception section 61 receives the user information and the apparatus information together with the request for connection to the address book URL, and thus the permission information management section 67 determines whether or not tied information, which is obtained by tying the user information and the apparatus information to each other, is stored as the permission information, and if such information is stored, transmits information indicating that such information is stored to the address book management section 64. In the second operation example, meanwhile, the reception section 61 receives the user information together with the request for connection to the address book URL, and thus the permission information management section 67 determines whether or not the user information is stored as the permission information, and if such information is stored, transmits information indicating that such information is stored to the address book management section 64.

[Operation of Information Processing System]

First Operation Example

FIGS. 6A and 6B are sequence diagrams illustrating a first operation example of the information processing system 1 according to the present exemplary embodiment.

First, when the user causes the portable terminal 10 to touch the NFC reader/writer of the image processing apparatus 30, the first transmission section 21 of the portable terminal 10 transmits an address book request including the user information, which is held by the terminal itself, to the image processing apparatus 30 through NFC (step S201).

The first reception section 42 of the image processing apparatus 30 receives the address book request which is transmitted in step S201 (step S401). Then, the second transmission section 43 transmits the address book request including the user information to the server 50 (step S402).

Consequently, the reception section 61 of the server 50 receives the address book request including the user information which is transmitted in step S402 (step S601). Then, the authentication section 62 performs an authentication on the basis of the user information which is included in the address book request (step S602). If the authentication section 62 fails in performing an authentication, the process is ended. If the authentication section 62 successfully performs an authentication, the address book management section 64 references the address book storage section 63, and acquires an address book URL corresponding to the user information (step S603). Then, the transmission section 65 transmits the address book URL to the image processing apparatus 30 (step S604).

The second reception section 44 of the image processing apparatus 30 receives the address book URL which is transmitted in step S604 (step S403). Then, the second transmission section 43 transmits the user information, which is included in the address book request which is received in step S401, and the apparatus information, which is held by the apparatus itself, to the server 50 (step S404).

Consequently, the reception section 61 of the server 50 receives the user information and the apparatus information which are transmitted in step S404 (step S605). Then, the permission information management section 67 stores permission information including the user information and the apparatus information in the permission information storage section 66 (step S606). At this time, a timer is started for the permission information which is stored in the permission information storage section 66. The timer may be started by setting the timer start time to the current time in the permission information, for example.

On the other hand, the first transmission section 41 of the image processing apparatus 30 transmits the address book URL, which is received in step S403, and the apparatus information, which is held by the apparatus itself, to the portable terminal 10 (step S405). At this time, the apparatus information may be transmitted as parameters of the address book URL, for example.

The first reception section 22 of the portable terminal 10 receives the address book URL and the apparatus information which are transmitted in step S405 (step S202). The address book URL is displayed on the touch screen 14 by the display section 23.

Next, the user performs an operation for connection to the address book URL which is displayed on the touch screen 14. When the operation receiving section 24 receives this operation, the second transmission section 25 transmits the user information, which is held by the terminal itself, and the apparatus information, which is received in step S202, to the server 50 as a request for connection to the address book URL which is received in step S202 (step S203).

Consequently, the reception section 61 of the server 50 receives the user information and the apparatus information which are transmitted in step S203 (step S607). Then, the permission information management section 67 determines whether or not permission information including the user information and the apparatus information is stored in the permission information storage section 66 (step S608). If it is determined that permission information including the user information and the apparatus information is stored in the permission information storage section 66, the permission information management section 67 determines whether or not the permission information has timed out (step S609). This determination may be made by checking whether or not a time determined in advance has elapsed since the timer start time which is set in the permission information, for example. If it is not determined in step S609 that the permission information has timed out, the address book management section 64 acquires a piece of address book data corresponding to the user information and the apparatus information from the address book storage section 63 (step S610). Then, the transmission section 65 transmits the piece of address book data to the portable terminal 10 (step S611). The permission information which gives permission for transmission is preferably deleted from the permission information storage section 66 when the piece of address book data is transmitted to the portable terminal 10. In the case where it is not determined in step S608 that permission information including the user information and the apparatus information is stored in the permission information storage section 66, and in the case where it is determined in step S609 that the permission information has timed out, the process is ended. The permission information is also preferably deleted from the permission information storage section 66 when the permission information has timed out.

The second reception section 26 of the portable terminal 10 receives the piece of address book data which is transmitted in step S611 (step S204). The piece of address book data is displayed on the touch screen 14 by the display section 23, and stored in the address book storage section 27 by the address book management section 28.

In this state, the user operates the piece of address book data on the touch screen 14, and performs an operation to request the image processing apparatus 30 to perform a process using at least part of the piece of address book data. When the operation receiving section 24 receives this operation, the first transmission section 21 transmits an instruction for this process to the image processing apparatus 30 through NFC (step S205).

The first reception section 42 of the image processing apparatus 30 receives the instruction for the process which is transmitted in step S205 (step S406). Then, the processing section 45 performs the process according to the instruction (step S407).

Meanwhile, the address book management section 28 of the portable terminal 10 determines whether or not use of the piece of address book data is finished (step S206). If it is not determined that use of the piece of address book data is finished, the process returns to step S205. If it is determined that use of the piece of address book data is ended, the address book management section 28 deletes the piece of address book data which is stored in the address book storage section 27 in step S204 (step S207).

Second Operation Example

A second operation example of the information processing system 1 according to the present exemplary embodiment is different from the first operation example illustrated in FIGS. 6A and 6B in that the apparatus information is not used.

In this case, first, only the user information is transmitted from the image processing apparatus 30 to the server 50 in steps S404 and S605. Since the user information has already been transmitted from the image processing apparatus 30 to the server 50 in steps S402 and S601, however, steps S404 and S605 may not be executed. Meanwhile, the permission information management section 67 of the server 50 stores permission information including the user information, and not including the apparatus information, in the permission information storage section 66 in step S606.

Meanwhile, the first transmission section 41 of the image processing apparatus 30 transmits the address book URL to the portable terminal 10, and does not transmit the apparatus information to the portable terminal 10, in step S405. Consequently, the first reception section 22 of the portable terminal 10 receives the address book URL, and does not receive the apparatus information, in step S202.

Further, the second transmission section 25 of the portable terminal 10 transmits the user information to the server 50, and does not transmit the apparatus information to the server 50, in step S203. Consequently, the reception section 61 of the server 50 receives the user information, and does not receive the apparatus information, in step S607. Then, the permission information management section 67 determines whether or not permission information including the user information is stored in the permission information storage section 66 in step S608. Then, if it is determined that permission information including the user information is stored in the permission information storage section 66 and that the permission information has not timed out, the address book management section 64 acquires a piece of address book data corresponding to the user information from the address book storage section 63 in step S610.

Third Operation Example

Figure 7B:
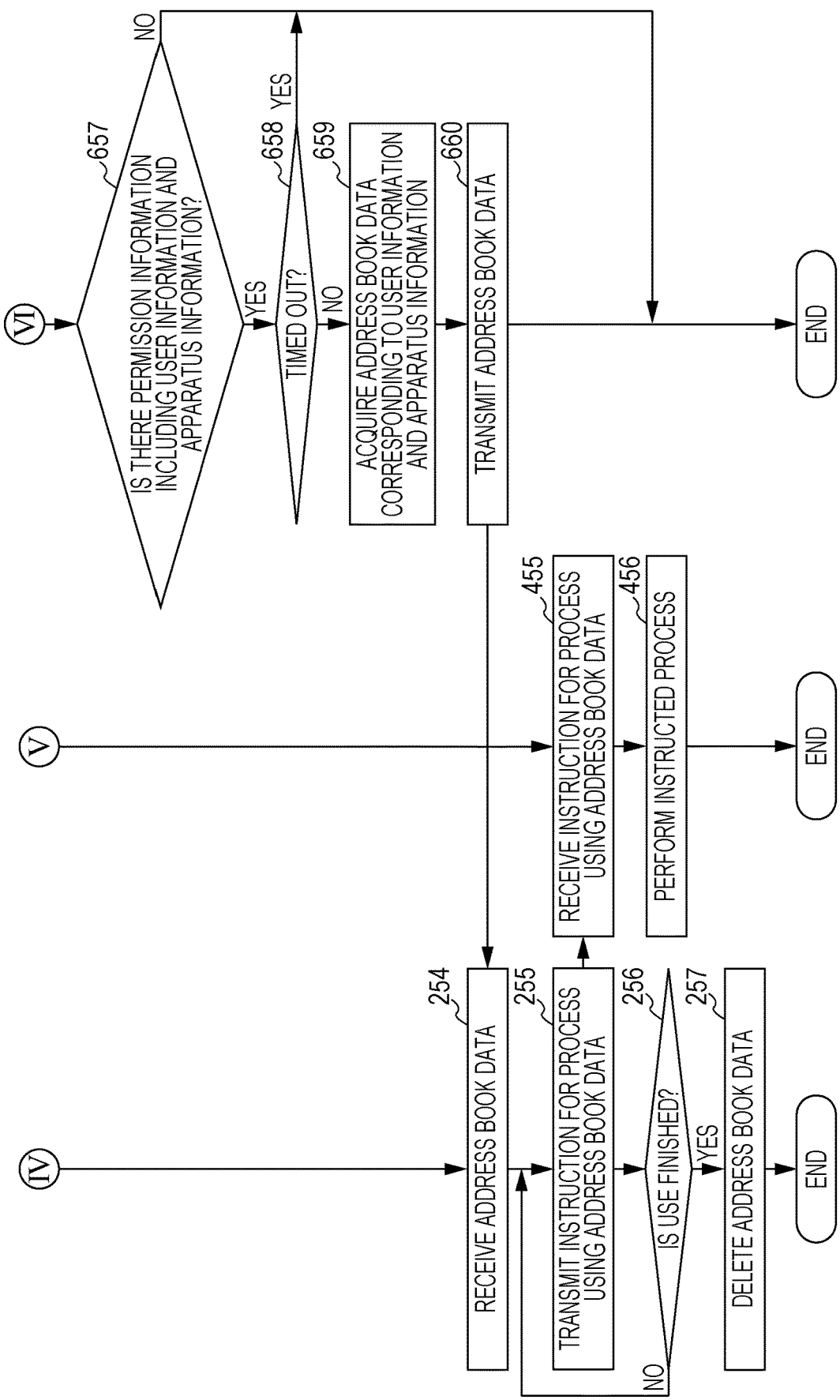

FIGS. 7A and 7B are sequence diagrams illustrating a third operation example of the information processing system 1 according to the present exemplary embodiment.

First, when the user causes the portable terminal 10 to touch the NFC reader/writer of the image processing apparatus 30, the first transmission section 21 of the portable terminal 10 transmits an address book request including the user information, which is held by the terminal itself, to the image processing apparatus 30 through NFC (step S251).

The first reception section 42 of the image processing apparatus 30 receives the address book request which is transmitted in step S251 (step S451). Then, the second transmission section 43 transmits an address book request including not only the user information but also the apparatus information, which is held by the apparatus itself, to the server 50 (step S452).

Consequently, the reception section 61 of the server 50 receives the address book request including the user information and the apparatus information which is transmitted in step S452 (step S651). Then, the authentication section 62 performs an authentication on the basis of the user information and the apparatus information which are included in the address book request (step S652). If the authentication section 62 fails in performing an authentication, the process is ended. If the authentication section 62 successfully performs an authentication, the address book management section 64 references the address book storage section 63, and acquires an address book URL corresponding to the user information and the apparatus information (step S653). Then, the transmission section 65 transmits the address book URL to the image processing apparatus 30 (step S654).

The second reception section 44 of the image processing apparatus 30 receives the address book URL which is transmitted in step S654 (step S453).

Meanwhile, the permission information management section 67 of the server 50 stores permission information including the user information and the apparatus information in the permission information storage section 66 (step S655). At this time, a timer is started for the permission information which is stored in the permission information storage section 66. The timer may be started by setting the timer start time to the current time in the permission information, for example.

On the other hand, the first transmission section 41 of the image processing apparatus 30 transmits the address book URL, which is received in step S453, and the apparatus information, which is held by the apparatus itself, to the portable terminal 10 (step S454). At this time, the apparatus information may be transmitted as parameters of the address book URL, for example.

The first reception section 22 of the portable terminal 10 receives the address book URL and the apparatus information which are transmitted in step S454 (step S252). The address book URL is displayed on the touch screen 14 by the display section 23.

Next, the user performs an operation for connection to the address book URL which is displayed on the touch screen 14. When the operation receiving section 24 receives this operation, the second transmission section 25 transmits the user information, which is held by the terminal itself, and the apparatus information, which is received in step S252, to the server 50 as a request for connection to the address book URL which is received in step S252 (step S253).

Consequently, the reception section 61 of the server 50 receives the user information and the apparatus information which are transmitted in step S253 (step S656). Then, the permission information management section 67 determines whether or not permission information including the user information and the apparatus information is stored in the permission information storage section 66 (step S657). If it is determined that permission information including the user information and the apparatus information is stored in the permission information storage section 66, the permission information management section 67 determines whether or not the permission information has timed out (step S658). This determination may be made by checking whether or not a time determined in advance has elapsed since the timer start time which is set in the permission information, for example. If it is not determined in step S658 that the permission information has timed out, the address book management section 64 acquires a piece of address book data corresponding to the user information and the apparatus information from the address book storage section 63 (step S659). Then, the transmission section 65 transmits the piece of address book data to the portable terminal 10 (step S660). The permission information which gives permission for transmission is preferably deleted from the permission information storage section 66 when the piece of address book data is transmitted to the portable terminal 10. In the case where it is not determined in step S657 that permission information including the user information and the apparatus information is stored in the permission information storage section 66, and in the case where it is determined in step S658 that the permission information has timed out, the process is ended. The permission information is also preferably deleted from the permission information storage section 66 when the permission information has timed out.

The second reception section 26 of the portable terminal 10 receives the piece of address book data which is transmitted in step S660 (step S254). The piece of address book data is displayed on the touch screen 14 by the display section 23, and stored in the address book storage section 27 by the address book management section 28.

In this state, the user operates the piece of address book data on the touch screen 14, and performs an operation to request the image processing apparatus 30 to perform a process using at least part of the piece of address book data. When the operation receiving section 24 receives this operation, the first transmission section 21 transmits an instruction for this process to the image processing apparatus 30 through NFC (step S255).

The first reception section 42 of the image processing apparatus 30 receives the instruction for the process which is transmitted in step S255 (step S455). Then, the processing section 45 performs the process according to the instruction (step S456).

Meanwhile, the address book management section 28 of the portable terminal 10 determines whether or not use of the piece of address book data is finished (step S256). If it is not determined that use of the piece of address book data is finished, the process returns to step S255. If it is determined that use of the piece of address book data is ended, the address book management section 28 deletes the piece of address book data which is stored in the address book storage section 27 in step S254 (step S257).

[Modifications]

In the present exemplary embodiment, the portable terminal 10 receives address book data from the server 50 to store the address book data. However, the present disclosure is not limited thereto. The portable terminal 10 may only connect to the server 50 to reference address book data.

In the present exemplary embodiment, in which the portable terminal 10 receives address book data from the server 50 to store the address book data, the portable terminal 10 transmits at least part of address book data to the image processing apparatus 30, and provides an instruction for a process that uses the at least part of address book data. However, the present disclosure is not limited thereto. In the case where the portable terminal 10 only connects to the server 50 to reference address book data, the portable terminal 10 may instruct the image processing apparatus 30 to perform a process by acquiring at least part of address book data from the server 50, or may instruct the server 50 to cause the image processing apparatus 30 to perform a process by transmitting at least part of address book data. In this case, such an instruction function is an example of an instruction function to instruct transmission of at least part of the specific data from the data management apparatus to the information processing apparatus.

In the present exemplary embodiment, in which the portable terminal 10 receives address book data from the server 50 to store the address book data, further, the portable terminal 10 deletes the address book data when use of the address book data is finished. However, the present disclosure is not limited thereto. In the case where the portable terminal 10 only connects to the server 50 to reference address book data, it is not necessary to delete the address book data when use of the address book data is finished. That is, in this case, it is not necessary to execute steps S206 and S207 in FIG. 6B and steps S256 and S257 in FIG. 7B.

In the present exemplary embodiment, the specific data which are necessary when using the image processing apparatus 30 are described as address book data. However, the present disclosure is not limited thereto.

For example, the specific data which are necessary when using the image processing apparatus 30 may be a list of secure documents that should be secured. In this case, the "address book data" may be read as a "list of secure documents" in the exemplary embodiment described above. The process that uses at least part of address book data may be a process such as printing of a secure document specified using at least part of a list of secure documents.

Alternatively, the specific data which are necessary when using the image processing apparatus 30 may be a secure document that should be secured itself. In this case, the "address book data" may be read as a "secure document" in the exemplary embodiment described above. The process that uses at least part of address book data may be a process such as printing of at least part of a secure document.

[Program]

The process performed by the portable terminal 10 according to the present exemplary embodiment may be prepared as a program such as application software, for example.

That is, a program that implements the present exemplary embodiment causes a computer to execute a process including: transmitting a use request for use of specific data, which are necessary when using an information processing apparatus, to the information processing apparatus; and receiving positional information which indicates a position, in a data management apparatus that manages the specific data, at which the specific data which are available to a user of the information processing apparatus are stored, from the information processing apparatus, the positional information being information transmitted by the information processing apparatus in response to reception of the use request, in which the transmitting the use request includes transmitting an instruction for a process that uses at least part of the specific data, which are referenced by connecting to the position which is indicated by the positional information in the data management apparatus, to the information processing apparatus.

The programs for implementing the present exemplary embodiment may be not only provided by a communication unit but also provided as stored in a storage medium such as a CD-ROM.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor programmed to:
receive a use request for use of specific data, which are necessary when using the information processing apparatus, from a terminal device held by a user of the information processing apparatus;
transmit the use request to a data management apparatus that manages the specific data and is separate from the information processing apparatus and the terminal device;
transmit positional information which indicates a position, where the specific data which are available to the user are stored in the data management apparatus, to the terminal device; and
perform a process that uses at least part of the specific data in response to reception of an instruction for the process from the terminal device which references the specific data by connecting to the position which is indicated by the positional information in the data management apparatus, wherein
the processor is further programmed to:
receive user information that indicates the user from the terminal device, and transmit the positional information to the terminal device in a case where an authentication is successfully performed using the user information; and
transmit the user information and apparatus information, which indicates the information processing apparatus, to the data management apparatus as information for permitting use of the specific data in a case where a connection request with the user information and the apparatus information for connection to the position, which is indicated by the positional information in the data management apparatus, is provided from the terminal device within a time determined in advance.

2. The information processing apparatus according to claim 1, wherein the processor is further programmed to:
receive the positional information from the data management apparatus in a case where an authentication is successfully performed using the user information, and
transmit the user information and the apparatus information to the data management apparatus in response to reception of the positional information from the data management apparatus.

3. The information processing apparatus according to claim 1, wherein the processor is further programmed to:
transmit the user information to the data management apparatus as information for permitting use of the specific data in a case where a connection request with the user information for connection to the position, which is indicated by the positional information in the data management apparatus, is provided from the terminal device within a time determined in advance.

4. The information processing apparatus according to claim 1, wherein the processor is further programmed to:
receive user information that indicates the user from the terminal device, and
transmit the positional information, in a case where an authentication is successfully performed using the user information and the apparatus information.

5. The information processing apparatus according to claim 4, wherein the processor is further programmed to:
transmit the user information and the apparatus information, which are used in the authentication, to the data management apparatus as information for permitting use of the specific data in a case where a connection request with the user information and the apparatus information for connection to the position, which is indicated by the positional information in the data management apparatus, is provided from the terminal device within a time determined in advance.

6. The information processing apparatus according to claim 4, wherein the processor is further programmed to
receive the positional information from the data management apparatus in a case where the authentication is successfully performed using the user information and the apparatus information.

7. A data management apparatus comprising:
a memory that stores specific data which are necessary when using an information processing apparatus; and
a processor programmed to:
receive a use request for use of the specific data from the information processing apparatus which has received the use request from a terminal device held by a user of the information processing apparatus; and
transmit positional information to the information processing apparatus in response to reception of the use request, the positional information being information that indicates a position in the memory at which the specific data which are available to the user are stored, and that is used for the terminal device to reference the specific data by connecting to the position in order to transmit an instruction for a process that uses at least part of the specific data to the information processing apparatus, wherein:
the processor is further programmed to:
receive user information, which indicates the user, from the information processing apparatus, and transmit the positional information to the information processing apparatus in a case where an authentication is successfully performed using the user information; and
receive the user information and apparatus information, which indicates the information processing apparatus, from the information processing apparatus as information for permitting use of the specific data in a case where a connection request with the user information and the apparatus information for connection to the position, which is indicated by the positional information in the memory, is provided from the terminal device, which has received the positional information and the apparatus information from the information processing apparatus, within a time determined in advance.

8. A non-transitory computer readable medium storing a program causing a computer to execute a process comprising:
- transmitting a use request for use of specific data, which are necessary when using an information processing apparatus, to the information processing apparatus; and
- receiving positional information which indicates a position, where the specific data which are available to a user of the information processing apparatus are stored in the data management apparatus, from the information processing apparatus, the positional information being information transmitted by the information processing apparatus in response to reception of the use request,
- wherein the transmitting the use request includes transmitting an instruction for a process that uses at least part of the specific data, which are referenced by connecting to the position in the data management apparatus, which is indicated by the positional information, to the information processing apparatus,
- wherein the process further comprises transmitting user information that indicates the user to the information processing apparatus, and receiving the positional information from the information processing apparatus in a case where an authentication is successfully performed using the user information, and
- wherein the user information and apparatus information, which indicates the information processing apparatus, are transmitted to the data management apparatus as information for permitting use of the specific data in a case where a connection request with the user information and the apparatus information for connection to the position, which is indicated by the positional information in the data management apparatus, is provided from the computer within a time determined in advance.

9. The non-transitory computer readable medium according to claim 8, the process further comprising
- receiving the specific data from the data management apparatus,
- wherein the transmitting the use request includes transmitting the at least part of the specific data to the information processing apparatus.

10. The non-transitory computer readable medium according to claim 9, the process further comprising
- deleting the specific data after the at least part of the specific data is transmitted to the information processing apparatus.

11. The non-transitory computer readable medium according to claim 8, the process further comprising
- instructing transmission of the at least part of the specific data from the data management apparatus to the information processing apparatus.

12. A non-transitory computer readable medium storing a program causing a computer of an information processing apparatus to execute a process comprising:
- receiving a use request for use of specific data, which are necessary when using the information processing apparatus, from a terminal device held by a user of the information processing apparatus;
- transmitting the use request to a data management apparatus that manages the specific data and is separate from the information processing apparatus and the terminal device;
- transmitting positional information, which indicates a position where the specific data which are available to the user are stored in the data management apparatus, to the terminal device; and
- performing a process that uses at least part of the specific data in response to reception of an instruction for the process from the terminal device which references the specific data by connecting to the position which is indicated by the positional information in the data management apparatus, wherein the process further comprises:
- receiving user information that indicates the user from the terminal device, and transmitting the positional information to the terminal device in a case where an authentication is successfully performed using the user information; and
- transmitting the user information and apparatus information, which indicates the information processing apparatus, to the data management apparatus as information for permitting use of the specific data in a case where a connection request with the user information and the apparatus information for connection to the position, which is indicated by the positional information in the data management apparatus, is provided from the terminal device within a time determined in advance.

* * * * *